(12) United States Patent
Naito et al.

(10) Patent No.: US 11,860,102 B2
(45) Date of Patent: Jan. 2, 2024

(54) FLUORESCENCE FINGERPRINT ANALYSIS FOR QUANTIFYING TSNAS IN PROCESSED TOBACCO RAW MATERIAL

(71) Applicant: JAPAN TOBACCO INC., Tokyo (JP)

(72) Inventors: Hirotaka Naito, Tokyo (JP); Takumi Koike, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 486 days.

(21) Appl. No.: 17/184,204

(22) Filed: Feb. 24, 2021

(65) Prior Publication Data
US 2021/0181114 A1   Jun. 17, 2021

Related U.S. Application Data

(63) Continuation of application No. PCT/JP2019/017019, filed on Apr. 22, 2019.

(30) Foreign Application Priority Data

Sep. 10, 2018   (WO) .................. PCT/JP2018/033371

(51) Int. Cl.
*G01N 21/00* (2006.01)
*G01N 21/64* (2006.01)
(Continued)

(52) U.S. Cl.
CPC ....... *G01N 21/6486* (2013.01); *G01N 21/278* (2013.01); *G01N 21/84* (2013.01); *G01N 2021/8466* (2013.01)

(58) Field of Classification Search
CPC .. G01N 21/6486; G01N 21/278; G01N 21/84; G01N 2021/8466
See application file for complete search history.

(56) References Cited

U.S. PATENT DOCUMENTS

| 6,786,221 B2* | 9/2004 | Lane ..................... A24B 15/18 131/309 |
| 10,718,713 B2 | 7/2020 | Horigome et al. |

(Continued)

FOREIGN PATENT DOCUMENTS

JP   2018-40779 A   3/2018

OTHER PUBLICATIONS

International Search Report for PCT/JP2019/017019 dated Jul. 16, 2019.

*Primary Examiner* — Pakee Fang
(74) *Attorney, Agent, or Firm* — Birch, Stewart, Kolasch & Birch, LLP

(57) ABSTRACT

To quickly and accurately quantify four types of TSNAs contained in a tobacco raw material by using fluorescence fingerprint information, a tobacco raw material containing known quantities of four types of TSNAs is prepared, and fluorescence fingerprint information thereof is acquired. The fluorescence fingerprint information is pre-processed, as needed, and an estimation model (calibration curve) for estimating the total quantity of the four types of TSNAs from the fluorescence fingerprint information is created. After verifying the calibration curve, the total quantity of the four types of TSNAs contained in an unknown tobacco raw material is estimated by applying the calibration curve to the unknown tobacco raw material. On the basis of the estimated value of the total quantity of the four types of TSNAs and the known abundance ratios of the individual TSNAs, the contained quantities of the four types of TSNAs are estimated.

20 Claims, 11 Drawing Sheets

(51) Int. Cl.
*G01N 21/27* (2006.01)
*G01N 21/84* (2006.01)

(56) References Cited

U.S. PATENT DOCUMENTS

2008/0094625 A1* 4/2008 Deevi ................ G01N 21/3563
356/319
2019/0265164 A1* 8/2019 Ticha ..................... A24B 15/26

* cited by examiner

FLUORESCENCE FINGERPRINT ANALYSIS FOR QUANTIFYING TSNAS IN PROCESSED TOBACCO RAW MATERIAL

CROSS REFERENCE TO RELATED APPLICATIONS

The present application is a continuation application of International Application No. PCT/JP2019/017019, filed on Apr. 22, 2019, which claims priority under 35 U.S.C. 119(a) to Patent Application No. PCT/JP2018/033371, filed in Japan on Sep. 10, 2018, all of which are hereby expressly incorporated by reference into the present application.

TECHNICAL FIELD

The present invention relates to a method, program and apparatus for quantifying TSNAs in a processed raw material using fluorescence fingerprint analysis, more particularly, to a method, program and apparatus that can be suitably used for quantifying trace components in TSNAs.

In this regard, the TSNAs refers to tobacco-specific nitrosamines, and the following four kinds of TSNAs can be listed as typical TSNAs; NNN (N'-nitrosonornicotine), NNK (4-(methyl nitrosoamino)-1-(3-pyridyl)-1-butanone), NAT (N'-nitrosoanatabine), and NAB (N'-nitrosoanabasine).

BACKGROUND ART

A generally used method for measuring components in a sample is a method for extracting various components in the sample with an extraction liquid and quantifying them by high performance liquid chromatography (HPLC-MS/MS). However, this method requires labor and time for sample preprocessing and measurement.

Near-infrared spectroscopy (NIR) analysis and quantification are known as a component analysis/quantification method that does not require sample preprocessing and enables non-destructive analysis, in order to analyze and quantify the components in the sample. In the NIR, a calibration curve is created and verified using a measured NIR spectrum, and analysis and quantification of the components are performed using the created calibration curve.

Further, as a component analysis/quantification method that does not require sample preprocessing and enables non-destructive analysis, analysis/quantification using fluorescence fingerprint information is also known (for example, refer to patent Literature 1 and the like). Such fluorescence fingerprint analysis partially shares its characteristics with the NIR in the point that a calibration curve is created and verified using the measured/acquired fluorescence fingerprint information and component analysis and quantification is performed using the created calibration curve. The outline of the fluorescence fingerprint and the fluorescence fingerprint analysis will be briefly described below.

As a result that excitation light is applied to a test sample containing fluorescent material, while changing the wavelength of the excitation light gradually, and light (fluorescence) emitted from the test sample is measured, points corresponding to the measurement are plotted in a three-dimensional space which comprises three orthogonal axes, i.e., the excitation wavelength ($\lambda Ex$), the fluorescence wavelength (measured wavelength) ($\lambda Em$), and the fluorescence intensity (IEx, Em), as shown in FIG. 2.

A visualization of a set of these points is called a fluorescence fingerprint or an Excitation Emission Matrix (EEM).

The fluorescence fingerprint can be represented as a three-dimensional graph (refer to FIG. 3), and a two-dimensional graph (refer to FIG. 4), by displaying the fluorescence intensity of the respective points in a contour line shape, a color distribution, or the like.

Such a fluorescence fingerprint indicates a pattern having a huge amount of three-dimensional information peculiar to a test sample, and can be used for various types of discriminations, quantifications, and so on.

Compared with other spectroscopic analysis methods, such fluorescence fingerprint analysis has advantages that characterization of a test sample is possible without preprocessing of the test sample such as fluorescent staining, operation is easy and measurement can be completed in a short period of time, the amount of information is large and quantification can be performed relatively easily, non-destructive/non-contact measurement is possible, the device is relatively inexpensive since ultraviolet to visible light is used, and so on.

In order to measure fluorescence fingerprints, a fluorescence spectrophotometer having a function of scanning the excitation wavelength and continuously measuring each fluorescence spectrum is required, and a fluorescence spectrophotometer having such a function is also commercially available. (F-7000 manufactured by Hitachi High-Tech Science Co., Ltd., etc.).

CITATION LIST

Patent Literature

PTL 1: Japanese Patent Application Public Disclosure No. 2018-040779

SUMMARY OF INVENTION

Technical Problem

In the case that a high performance liquid chromatograph (HPLC-MS/MS) is applied to TSNAs measurement, preprocessing and measurement of a sample require labor and time, as explained above.

Further, although application of the NIR to TSNAs measurement may be considered, it is difficult to adopt the NIR for the reasons listed below:

(1) It does not have sufficient sensitivity for measuring concentration ranges of the TSNAs in a tobacco raw material.

(2) The peaks of the TSNAs overlap with the peak of nicotine in a sample, and, further, the quantity of existing nicotine is much greater than those of the TSNAs, so that the peaks of the TSNAs are buried in the peak of nicotine, and, consequently, it is difficult to identify the peaks of the TSNAs.

Therefore, it is conceivable to apply, to TSNAs measurement, fluorescence fingerprint analysis, the sensitivity of which can be set to a higher than the sensitivity of NIR. In this case, it is possible to identify the peak positions of nicotine and TSNAs, since measurements that take into account even the differences in minute chemical structures compared to NIR can be performed. However, especially, regarding NNK and NAB in the above-mentioned four kinds of TSNAs, since the quantity of each of the NNK and the NAB existing in the tobacco raw material is extremely small, it is difficult to quantify independently each of them even if fluorescence fingerprint analysis is simply used.

Solution to Problem

In order to solve the above-mentioned problems, the inventors of the present invention have devised a novel method for quantifying TSNAs using fluorescence fingerprint analysis. The outline of the method will be described below.

The inventors of the present invention have reviewed the four kinds of TSNAs existing in processed raw materials (tobacco raw materials), and, as a result, obtained the finding that, even if the quantities of the four kinds of TSNAs are different among tobacco raw materials, there is no significant difference in the ratios of the quantities of the four kinds of TSNAs (the abundance ratios between the respective TSNAs) among tobacco raw materials of the same tobacco species.

In other words, the following finding was obtained;
That is, when the quantities of the four kinds of TSNAs (for example, % by weight) contained in each of tobacco raw materials of the same species are NNN: a, NAT: b, NNK: c, and NAB: d, the ratios among them (the abundance ratio between the respective TSNAs), a:b:c:d, was found to be substantially constant in the same tobacco species. Taking Burley as an example of tobacco species, the finding that the ratio a:b:c:d approximately equals to 55: 35:8:2 is obtained.

Further, as a result of additional study based on the above findings, it was found that, in the case that the four peaks of the four types of TSNAs are regarded as a single peak as a whole, while the height of the peaks vary according to the amount of components of tobacco raw materials, tobacco raw materials of the same tobacco species have almost similar shapes of the single peaks (details will be described later).

Thus, a conclusion derived therefrom is that, by recognizing the total of the four kinds of TSNAs as a peak of a fluorescence fingerprint and extracting this peak, it is possible to quantify the total amount of the four kinds of TSNAs including the quantitative values of components that are difficult to quantify by themselves, such as NNK and NAB and to quantify the four kinds of TSNAs based on the total amount and the known abundance ratio among the respective TSNAs.

The present invention has been devised based on a result of the study explained above, and examples of embodiments of the present invention are as follows:

(Aspect 1)

A method for quantifying tobacco raw materials using fluorescence fingerprint analysis, comprising:

a fluorescence fingerprint information obtaining process for obtaining fluorescence fingerprint information consisting of excitation wavelength, fluorescent wavelength, and fluorescence intensity data of tobacco raw materials which contain four kinds of tobacco-specific nitrosamines (TSNAs) which are NNN, NNK, NAT, and NAB;

an inference model creating process for obtaining a calibration curve by setting the fluorescence fingerprint information as an explanatory variable and setting total amount of the contained four kinds of TSNAs, that are calculated from values of known quantities of the four kinds of TSNAs contained in the tobacco raw materials, as a response variable;

a total amount inferring process for inferring a total amount of the four kinds of TSNAs contained in the tobacco raw materials, based on the calibration curve and fluorescence fingerprint information of tobacco raw materials which contain unknown quantities of the four kinds of TSNAs; and a contained quantity inferring process for inferring the contained quantities of the four kinds of TSNAs, based on the inferred total amount of the four kinds of TSNAs and a known abundance ratio among the four kinds of TSNAs.

(Aspect 2)

The method for quantifying tobacco raw materials using fluorescence fingerprint analysis as recited in Aspect 1 characterized in that, in the fluorescence fingerprint information obtaining process, the fluorescence fingerprint information is obtained by measuring fluorescence via a filter which reduces intensity of light in a specific wavelength range.

(Aspect 3)

The method for quantifying tobacco raw materials using fluorescence fingerprint analysis as recited in Aspect 2 characterized in that the specific wavelength range is equal to or greater than 400 nm.

(Aspect 4)

The method for quantifying tobacco raw materials using fluorescence fingerprint analysis as recited in Aspects 1-3 characterized in that, in the inference model constructing process, the calibration curve is created by performing multivariate analysis.

(Aspect 5)

The method for quantifying tobacco raw materials using fluorescence fingerprint analysis as recited in Aspect 4 characterized in that the multivariate analysis is PLS regression analysis.

(Aspect 6)

The method for quantifying tobacco raw materials using fluorescence fingerprint analysis as recited in Aspects 1-5 characterized in that the method further comprises a pre-processing process comprising a deletion process applied to the fluorescence fingerprint information.

(Aspect 7)

The method for quantifying tobacco raw materials using fluorescence fingerprint analysis as recited in Aspects 1-6 characterized in that a test sample is pulverized and mixed to have a powder form, before irradiation of excitation light thereon.

(Aspect 8)

The method for quantifying tobacco raw materials using fluorescence fingerprint analysis as recited in Aspect 7 characterized in that the test sample is pulverized to become particles in such a manner that each of the particles has a size equal to or less than 1 nm.

(Aspect 9)

The method for quantifying tobacco raw materials using fluorescence fingerprint analysis as recited in Aspects 1-8 characterized in that the tobacco raw material is stored for a predetermined period of time under a predetermined harmony condition, in advance, for making the water content therein constant.

(Aspect 10)

The method for quantifying tobacco raw materials using fluorescence fingerprint analysis as recited in Aspect 9 characterized in that the predetermined harmony condition is a condition specifying that the place is the inside of a room in which temperature is 22 degrees Celsius and humidity is 60 percent, and the predetermined period of time is equal to or longer than 24 hours.

(Aspect 11)

A program for causing a computer to perform the method recited in Aspects 1-10.

(Aspect 12)

An apparatus characterized in that it comprises:

an inference model creating means that inputs fluorescence fingerprint information consisting of excitation wavelength, fluorescent wavelength, and fluorescence intensity data of tobacco raw materials which contain four kinds of tobacco-specific nitrosamines (TSNAs) which are NNN, NNK, NAT, and NAB, and obtains a calibration curve by setting the fluorescence fingerprint information as an explanatory variable and setting total amount of the contained four kinds of TSNAs, that are calculated from values of known quantities of the four kinds of TSNAs contained in the tobacco raw materials, as a response variable;

a total amount inferring means for inferring a total amount of the four kinds of TSNAs contained in the tobacco raw materials, based on the calibration curve and fluorescence fingerprint information of tobacco raw materials which contain unknown quantities of the four kinds of TSNAs; and a contained quantity inferring means for inferring the contained quantities of the four kinds of TSNAs, based on the inferred total amount of the four kinds of TSNAs and a known abundance ratio among the four kinds of TSNAs.

(Aspect 13)

The apparatus as recited in Aspect 12 characterized in that the fluorescence fingerprint information is obtained by measuring fluorescence via a filter which reduces intensity of light in a specific wavelength range.

(Aspect 14)

The apparatus as recited in Aspect 13 characterized in that the specific wavelength range is equal to or greater than 400 nm.

(Aspect 15)

The apparatus as recited in Aspects 12-14 characterized in that the apparatus further comprises a preprocessing means for performing a pre-process applied to the fluorescence fingerprint information.

(Aspect 16)

The apparatus as recited in Aspect 15 characterized in that the pre-process comprises a deletion process applied to the fluorescence fingerprint information.

It should be reminded that a "program" refers to a data processing method described based on a language, or a description method, and does not refer to the form of a source code, a binary code, or the like. Further, although a "program" may be configured in a single form, may have a distributed configuration as multiple modules or libraries, and may be configured to cooperate with other existing programs to achieve its function.

Further, the "apparatus" may be configured as hardware, but may also be configured as a combination of function realizing means for realizing various functions by computer software. The function realizing means may include, for example, a program module.

Advantageous Effects of Invention

According to the present invention, it is possible to quickly and accurately quantify the four kinds of TSNAs contained in the processed raw material.

DESCRIPTION OF EMBODIMENTS

In the following description, although embodiments of the present invention will be explained, it should be reminded that the present invention is not limited by the embodiments of the present invention explained below.

<An Overview of One Embodiment of the Present Invention>

Figure 1:
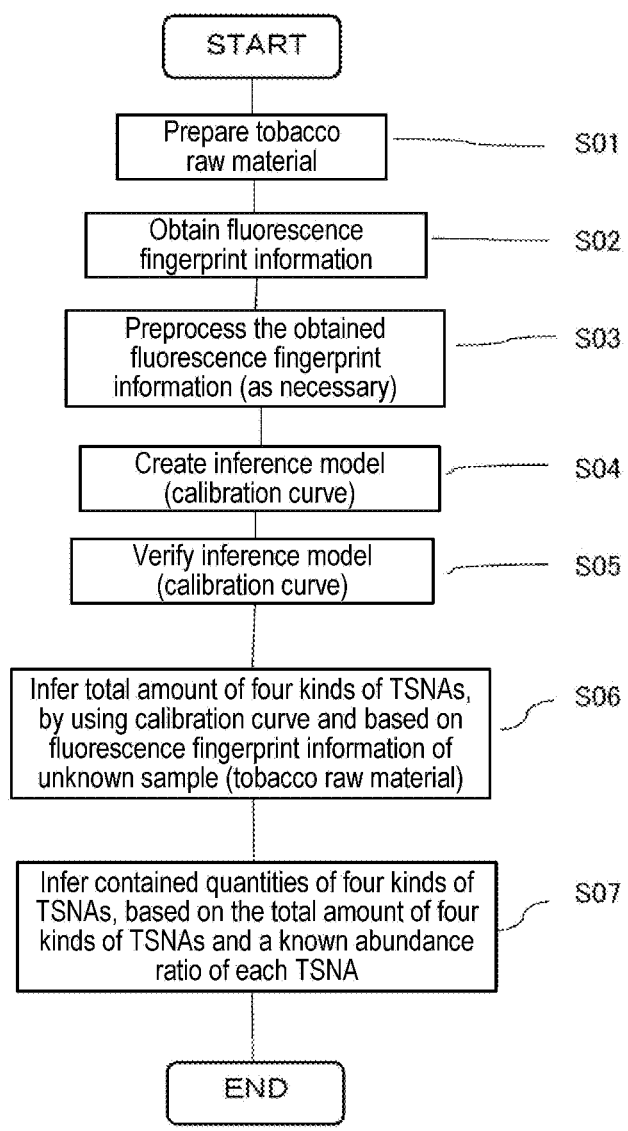
FIG. 1 is a flowchart for explaining an overview of one embodiment of the present invention.
Figure 2:
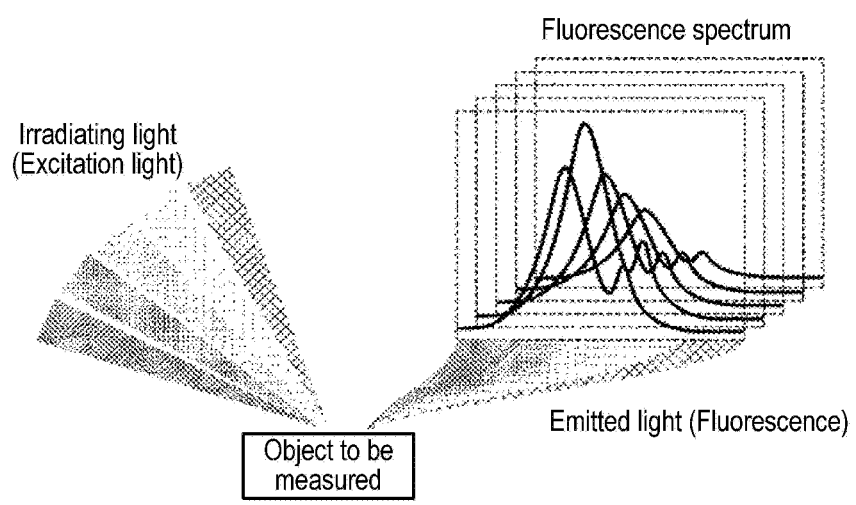
FIG. 2 is an explanatory drawing showing an overview of a spectrum of fluorescence emitted from an object of measurement when the object of measurement is irradiated with excitation light.
Figure 3:
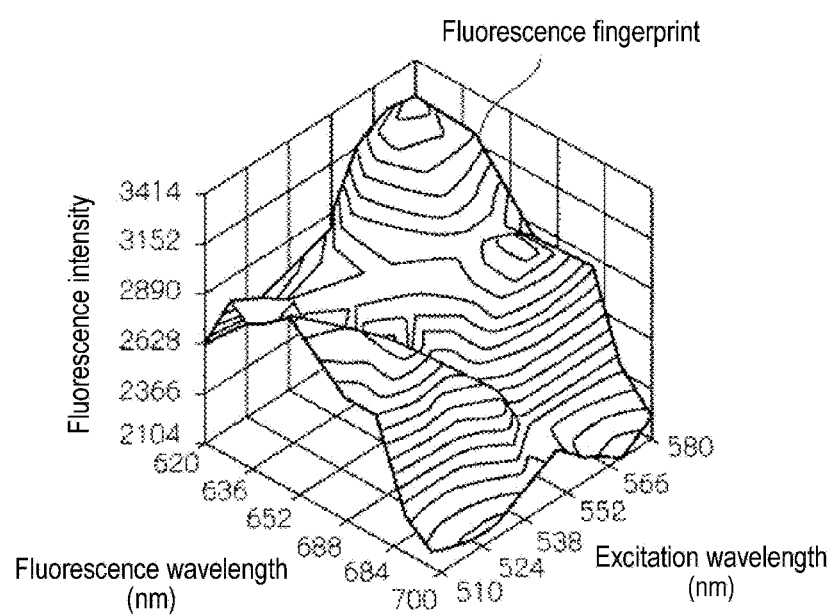
FIG. 3 is a contour-shaped graph showing an example of a fluorescence fingerprint three-dimensionally.
Figure 4:
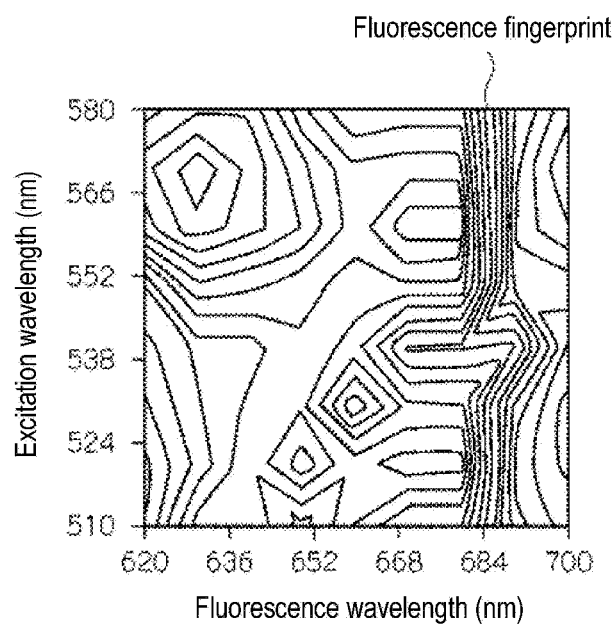
FIG. 4 is a contour-shaped graph showing an example of a fluorescence fingerprint two-dimensionally.

FIG. 1 is a flowchart for explaining an overview of one embodiment of the present invention.

First, test sample (tobacco raw materials), which contains known quantities of four kinds of TSNAs is prepared (S01); and fluorescence fingerprint of the above known test sample is measured to obtain fluorescence fingerprint information (S02).

In this regard, when obtaining the fluorescence fingerprint information, it is desired to measure fluorescence via a filter for reducing intensity of light in a specific wavelength range. Further, it is preferable that the specific wavelength range be set to that equal to or greater than 400 nm. Details thereof will be explained later (refer to [A preferred embodiment of the present invention]).

Next, a pre-process is applied to the obtained fluorescence fingerprint information as necessary (S03). In this regard, the above pre-process may be omitted. Details of the pre-process will be explained later.

Next, the relationship between the obtained fluorescence fingerprint information and the total amount of the four kinds of TSNAs contained in the test sample is modeled to create an inference model (a calibration curve) (S04). Specifically, in this modelling, an estimation equation, in which the obtained fluorescence fingerprint information is set as an explanatory variable and total amount of the four kinds of TSNAs is set as response variable, is constructed by using various multivariate analysis techniques and data mining techniques; and a calibration curve (a regression equation)

for inferring total amount of the four kinds of TSNAs in the test sample from the fluorescence fingerprint information is constructed. In this regard, the algorithm used for constructing an estimation equation may be a machine learning algorithm that is versatile and able to handle a nonlinear phenomenon, such as a Support Vector Machine (SVM), Random Forest (RF), a neural network, or the like. An example of a multivariate analysis technique used for modelling will be explained later.

The inference model (the calibration curve) constructed as explained above is verified to confirm its effectiveness (S05).

By using the inference model (the calibration curve), the effectiveness of which has been confirmed, and based on fluorescence fingerprint information of an unknown processed raw material (a tobacco raw material), a total amount of the four kinds of TSNAs contained as components in the unknown processed raw material (the tobacco raw material) is inferred (S06)

The contained quantities of the four kinds of TSNAs are inferred, based on the inferred total amount of the four kinds of TSNAs and a known abundance ratio of each TSNA (S07).

<Overview of Another Embodiment of the Present Invention>

Figure 8:
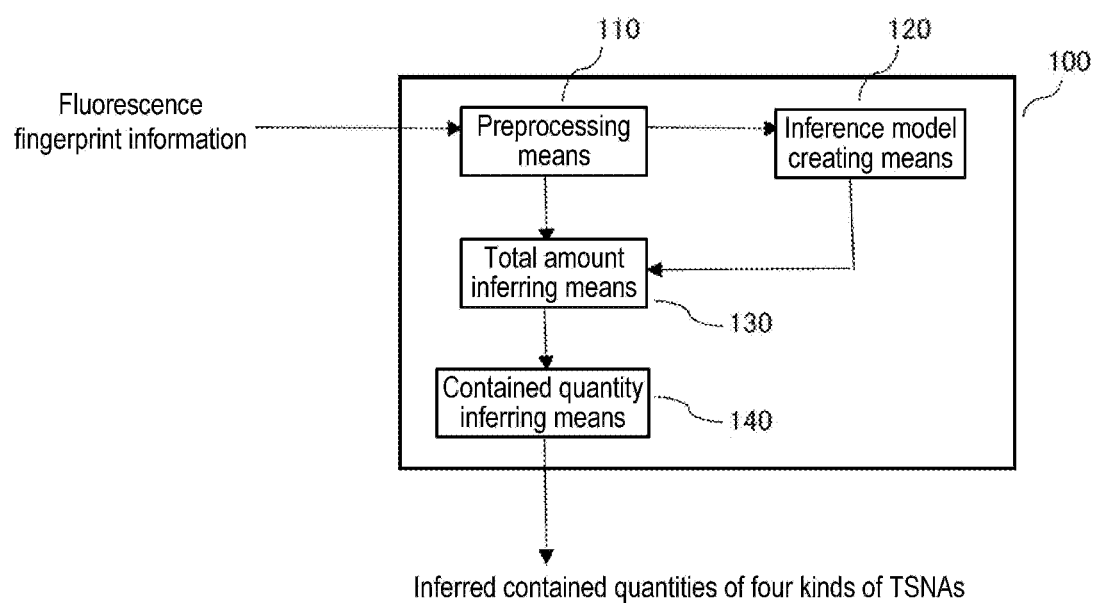
FIG. 8 is a block diagram for explaining an overview of another embodiment of the present invention.

FIG. 8 is a block diagram for explaining an overview of another embodiment of the present invention.

A TSNAs quantification apparatus 100 for quantifying TSNAs in a processed raw material comprises: a preprocessing means 110 that inputs fluorescence fingerprint information consisting of excitation wavelength, fluorescent wavelength, and fluorescence intensity data of samples (tobacco raw materials), and preprocesses the inputted fluorescence fingerprint information; an inference model creating means 120 that obtains a calibration curve by receiving an output from the preprocessing means 110 as an input, setting the preprocessed fluorescence fingerprint information as an explanatory variable, and setting total amount of four kinds of TSNAs contained in the test samples as a response variable; a total amount inferring means 130 that infers total amount of the four kinds of TSNAs contained as components in the unknown processed raw material (tobacco raw materials), based on the calibration curve obtained by the inference model creating means 120 and fluorescence fingerprint information of the unknown processed raw material (tobacco raw materials); and a contained quantity inferring means 140 that infers the contained quantities of the four kinds of TSNAs, based on the inferred total quantity of the four kinds of TSNAs and a known abundance ratio among the four kinds of TSNAs. In this regard, the preprocessing means 110 may be omitted.

First, using a known fluorescence spectrophotometer or the like, fluorescence fingerprint information of a test sample, which contains the known kinds and quantities of components, is obtained.

In this regard, when obtaining the fluorescence fingerprint information, it is desired to measure fluorescence via a filter for reducing intensity of light in a specific wavelength range. Further, it is preferable that the specific wavelength range be set to that equal to or greater than 400 nm. Details thereof will be explained later (refer to [A preferred embodiment of the present invention]).

Next, the obtained fluorescence fingerprint information is inputted to the preprocessing means 110 to preprocess the inputted fluorescence fingerprint information. In this regard, the above preprocessing may be omitted. Details of the preprocessing, in the case that it is performed, will be explained later.

Next, by the inference model creating means 120, the relationship between the preprocessed fluorescence fingerprint information and total amount of the four kinds of TSNAs is modeled to create an inference model (a calibration curve). The above modeling is similar to that in the above-explained embodiment of the present invention. Thereafter, the thus created inference model (the calibration curve) is verified to confirm its effectiveness; and the inference model (the calibration curve), the effectiveness of which is confirmed, is stored in a memory or the like which is not shown in the figure.

The total amount inferring means 130 infers, using the inference model (the calibration curve), the effectiveness of which is confirmed, total amount of the four kinds of TSNAs contained as components in an unknown processed raw material (tobacco raw material) based on fluorescence fingerprint information of the unknown processed raw material (tobacco raw material). In this regard, although it is desirable to preprocess, by the preprocessing means 110, fluorescence fingerprint information of the unknown sample (the TSNAs quantification apparatus 100 in FIG. 8 adopts a configuration such as that explained above), it may be possible to omit the above preprocessing according to necessity.

The contained quantity inferring means 140 infers the contained quantities of the four kinds of TSNAs, based on the inferred total amount of the four kinds of TSNAs and a known abundance ratio among the respective TSNAs. In this regard, information of the known abundance ratio among the respective TSNAs may be stored in the contained quantity inferring means 140 or the TSNAs quantification apparatus 100 in advance, or may be supplied from the outside to the TSNAs quantification apparatus 100.

<Multivariate Analyses Used in Modeling>

Regarding multivariate analysis techniques used in modeling, various types of analysis methods such as PLS (Partial Least Squares) regression analysis, multiple regression analysis, principal component regression analysis, least squares method may be used.

The PLS regression analysis is a technique for extracting principal components in such a manner that covariance between principal components and response variables becomes the maximum, and the technique is effective in the case that strong correlation exists among explanatory variables (in the case that multicollinearity exists).

The principal component regression analysis is a technique for extracting principal components in such a manner that variance of the principal components is maximized; wherein principal component analysis is performed using explanatory variables only, and multiple regression analysis using the least-squares method is performed between the obtained principal components and the response variables.

The multiple regression analysis is a technique wherein the least squares method is applied between explanatory variables and response variables, and it has a characteristic different from that of the principal component regression analysis.

Since each of the above analysis techniques is well known and the present invention does not require special processing when performing a modelling process, explanation of details of contents of the processing will be omitted; however, explanation of the PLS will be provided later in relation to the process for creating the calibration curve.

<Regarding the Technique for Recognizing a Total of Four Kinds of TSNAs as a Peak of a Fluorescence Fingerprint and Extracting the Peak>

As explained above, it becomes possible, for the present invention, to quantify the total amount of the four kinds of TSNAs in consideration of quantitative value of components such as NNK and NAB that is difficult to quantify by itself, by adopting the technique for recognizing the total of the four kinds of TSNAs as a peak of a fluorescence fingerprint and extracting the peak; and quantifying the four kinds of TSNAs based on the total amount and the known abundance ratio among the respective TSNAs.

Figure 5:
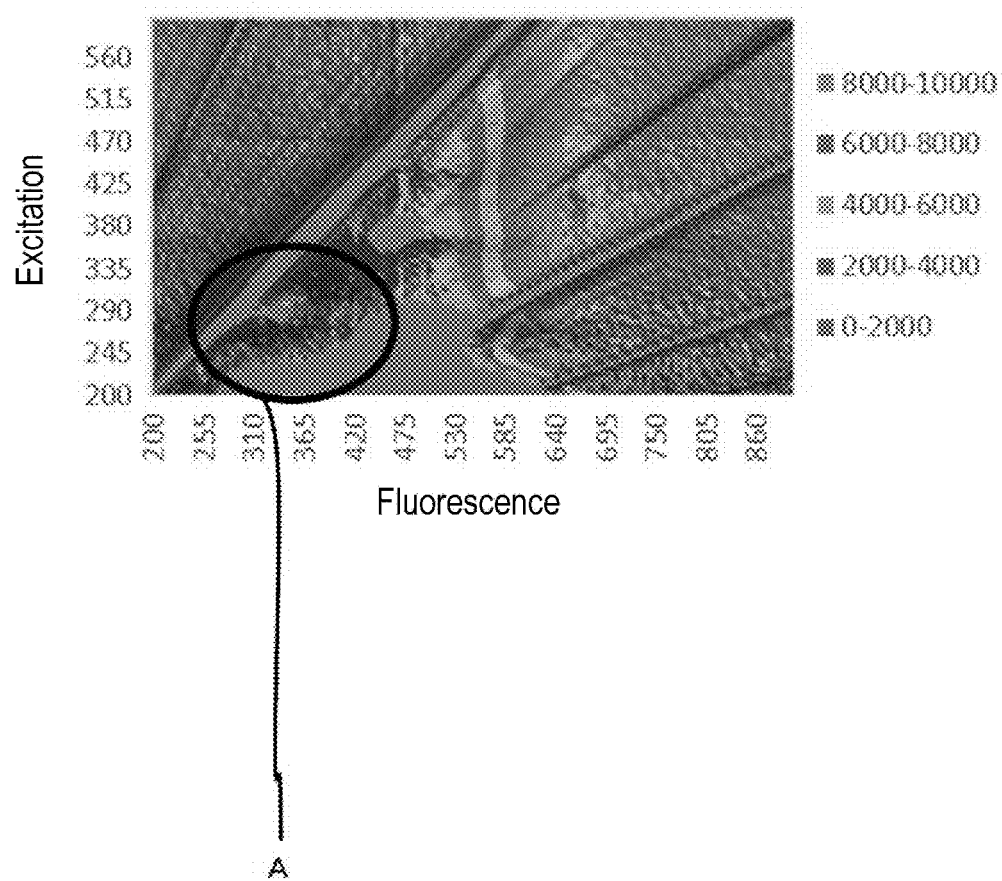
FIG. 5 is a figure representing an example of a fluorescence fingerprint of a sample.
Figure 6:
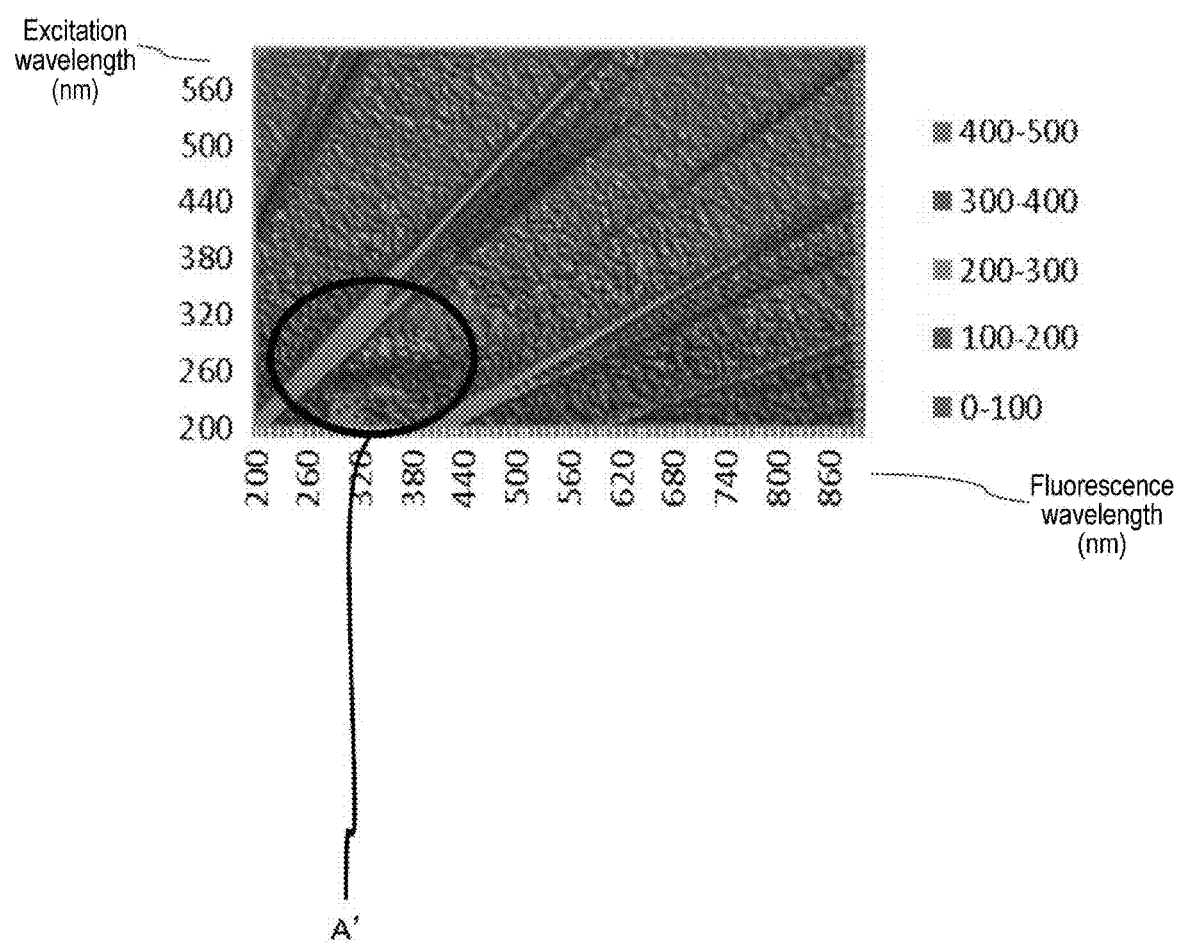
FIG. 6 is a figure representing an example of a fluorescence fingerprint of an authentic sample including TSNAs reagents.

With reference to FIGS. 5 and 6, it will be explained that, when the four peaks of the four kinds of TSNAs are viewed collectively as a single peak, the shapes of the single-peaks of tobacco raw materials become approximately similar to each other despite differences between the heights of the respective single-peaks, in the case that the tobacco raw materials belong to the same tobacco species.

FIG. 5 is a figure representing an example of a fluorescence fingerprint of a sample. As the sample, burley was used; and the total amount of the four kinds of TSNAs contained in the sample was 2.856 µg/g. It should be reminded that a process based on an adjustment condition that will be explained later, has been applied to the sample.

FIG. 6 is a figure representing an example of a fluorescence fingerprint of an authentic sample including TSNAs reagents. The authentic sample was prepared by mixing reagents of the four kinds of TSNAs with an ethanol solution, wherein the ratio among the four reagents was set to be approximately the same as the ratio among the four kinds of TSNAs contained in Burley; and the total amount of the four kinds of TSNAs contained in the authentic sample was 1.28 µg/g.

It should be reminded that the measurement conditions for the fluorescence fingerprints are the same for the both cases, and excitation light is 200-600 nm, fluorescence is 200-700 nm, resolution is 2.5 nm, slit width is 2.5 nm and photomultiplier-tube sensitivity is 950 V.

As a result of comparison between the fluorescence fingerprint information in FIG. 5 and the fluorescence fingerprint information in FIG. 6, the following findings could be obtained roughly:

The fluorescence fingerprint information of the four kinds of TSNAs observed in the authentic sample in FIG. 6 (refer to the region of the elliptical frame to which symbol "A'" has been assigned in FIG. 6 ("region A'")) could be observed in the sample in FIG. 5 (refer to the region of the elliptical frame to which symbol "A" has been assigned in FIG. 5 ("region A")).

When the region A' in FIG. 6 is compared with the region A in FIG. 5, it can be observed that the shapes of the both regions are approximately similar to each other, although there is a difference in the peak height of the fluorescence fingerprint information.

In FIG. 5, saturation has been occurring in many bands due to the influence of fluorescence of other materials in the sample (since sensitivity is set to the maximum value); however, the region A is identifiable even in the state explained above, so that it is considered that effect of contaminants thereon is low.

It is considered that, in actual measurement, it will be effective if differentiation of fluorescence fingerprint information of TSNAs is achieved, by deleting fluorescence fingerprint information of fluorescence in a band in which occurrence of saturation is predicted. Further, regarding preprocessing, it is considered that it will be effective if execution of a process, wherein saturation relating to a second derivative and so on may affect other wavelengths, is avoided.

In the following description, respective steps of one embodiment of the present invention will be explained.

[Preparing Test Samples (Tobacco Raw Materials)]

Regarding respective samples that contain known quantities of the four kinds of TSNAs, they were pulverized to a particle size of 1 mm diameter or less, and, thereafter, are sufficiently mixed, and the resultant mixtures were prepared as test samples.

Since the four kinds of TSNAs could be localized in a tobacco raw material, it is preferable that the sample be pulverized to a certain particle size (1 mm diameter or less) and sufficiently mixed before performing measurement, and, thereafter, fluorescence fingerprint be obtained. In this regard, the quantities of the four kinds of TSNAs in respective samples were quantified in advance by using a high performance liquid chromatograph (HPLC-MS/MS).

Further, a sample stored in advance for stabilizing the water content was used as the test sample. For making the water content in the test sample constant, it is preferable to store it under a harmony condition (the inside of a room in which temperature is 22 degrees Celsius and humidity is 60 percent) for 24 hours or more. By keeping the water content constant in advance as explained above, shifting of the peak is suppressed.

[Obtaining Fluorescence Fingerprint Information]

For obtaining fluorescence fingerprint information of the test samples, F-7000 manufactured by Hitachi High-Tech Science Corporation was used as the fluorescence fingerprint measuring device, and a reflection method (Front Face) was used when performing measurement.

The measurement conditions were as follows: excitation light of 200-600 nm, fluorescence of 200-700 nm, resolution of 2.5 nm, slit width 2.5 nm, and photomultiplier-tube sensitivity of 950 V. In this regard, when the resolution of 2.5 nm is taken into consideration, an error of at least approximately 5 nm is allowed with respect to the measured wavelength.

[Preprocessing Fluorescence Fingerprint Information]

While, when obtaining fluorescence fingerprint information of a sample, it is possible to use measured values of a fluorescence fingerprint (a fluorescence spectrum for each excitation wavelength) as they stand, it is required to perform various pre-processes, as necessary.

As a preprocessing technique for removing a noise from a measured fluorescence fingerprint and obtaining effective fluorescence fingerprint information, one or a combination of a process for removing non-fluorescent components, a process for removing scattered light, and a process for removing low-sensitivity regions, for example, may be adopted. Further, one or a combination of the following operation processes that may be applied to the obtained fluorescence fingerprint information may be adopted as a pre-process: centering, normalization, standardization, baseline correction, smoothing, auto-scaling, logarithmic conversion (log 10), secondary differentiation, and so on. Further, regarding the processing order when plural operation processes are combined, the following example order may be adopted: logarithmic conversion (Log 10)==>secondary differentiation==>normalization (normalize)==>auto-scaling (autoscale).

Also, as the processes for removing wavelengths that do not have contribution to component information, the following example techniques may be adopted; and, since the following respective processing techniques are known, explanation about them will be omitted:

(a) Variable important projection (VIP)
(b) Interval PLS (iPLS)
(c) Genetic algorithms (GA)
(d) Jack-knife analysis
(e) Forward interval PLS
(f) Backward interval PLS (biPLS)
(g) Synergy interval PLS (siPLS)
(h) LASSO type method The application order of preprocessing may be set appropriately; however, in view of efficiency of processing, it is preferable that the processes such as a process for removing non-fluorescent components, a process for removing scattered light, and a process for removing low-sensitivity regions, and so on be preceded.

In the above preprocessing, it is possible to use dedicated software such as Matlab, PLS#toolbox, and so on.

It should be reminded that, although only auto-scaling only is used as the preprocessing in the present embodiment, the technique used in the preprocessing is not necessarily limited to the above technique.

[Creation and Verification of a Calibration Curve]

Specifically, a calibration curve is created using the PLS regression analysis (this may be simply referred to as "PLS"), for example, wherein the obtained fluorescence fingerprint information is an explanatory variable and the total amount of the four kinds of TSNAs is a response variable.

An outline of the PLS regression analysis used when creating the calibration curve will be briefly explained below.

In the PLS, the explanatory variable X (matrix) and the response variable y (vector) satisfy the following two basic formulas (1) and (2):

$$X = TP^T + E \quad (1)$$

$$y = Tq + f \quad (2)$$

In the above formulas, T denotes a latent variable (matrix), P denotes a loading (matrix), E denotes a residual of the explanatory variable X (matrix), q denotes a coefficient (vector), f denotes a residual of the response variables y (vector), and $P^T$ denotes a transposed matrix of P.

In this connection, the PLS does not directly use information of the explanatory variables X for modeling the response variable y, but the PLS converts a part of the information of the explanatory variable X to the latent variable t, and models the response variable y using the latent variable t. In this regard, the number of latent variables may be determined by using, as an index, a predictive explanatory variance value obtained by performing cross-validation, for example. Further, a latent variable may sometimes be referred to as a principal component.

Especially, in the case of a single component model, (1) and (2) shown above can be represented by (3) and (4) shown below:

$$X = t_1 p_1^T + E \quad (3)$$

$$y = t_1 q_1 + f \quad (4)$$

In the above formulas, $t_1$ denotes a latent variables (vector), $p_1$ denotes a loading (vector), and $q_1$ denotes a coefficient (scalar).

Now, if it is supposed that $t_1$ is represented by a linear combination of X, (5) shown below holds:

$$t_1 = X w_1 \quad (5)$$

In the above formula, $w_1$ denotes a normalized weight vector.

The PLS is a method for obtaining $t_1$ that maximizes covariance $y^T t_1$ of y and $t_1$, under the condition that the norm of $w_1$ is 1 ($|w_1|=1$); and, for calculation of $t_1$, the so-called method of Lagrange multiplier may be used. Since the calculation technique using method of Lagrange multiplier is well known, details of calculation are omitted; and only results of calculation with respect to $w_1$, $p_1$, and $q_1$ are shown as those represented by (6), (7), and (8) below:

$$w_1 = X^T y / |X^T y| \quad (6)$$

$$p_1 = X^T t_1 / t_1^T t_1 \quad (7)$$

$$q_1 = y T t_1 / t_1^T t_1 \quad (8)$$

In this regard, $t_1$ in equations (7) and (8) is a vector calculated by substituting $w_1$, that is obtained by using equation (6), in equation (5).

A technique similar to the above technique can be used for calculation in a multi-component model, and, since the calculation technique is well known, its details will be omitted.

For creating a calibration curve and verifying the created calibration curve, a plurality of samples, which contain the known quantities of the four kinds of TSNAs in the samples are prepared separately as a sample group for calibration to be used for creating the calibration curve, and as a sample group for validation to be used for verifying the calibration curve to confirm its effectiveness. In this regard, in the present example, 40 samples were prepared as samples for calibration, and 19 samples were prepared for samples for validation. Further, although the number of wavelengths is limited by VIP to approximately 1000 wavelength, the present invention is not limited thereto.

To the calibration sample group, the above-explained PLS regression analysis (for example, the number of latent factors is 6), for example, is applied, and a calibration curve for inferring the total amount of the four kinds of TSNAs from obtained fluorescence fingerprint information is created. It should be reminded that the total amount of the four kinds of TSNAs in each sample used for creating the calibration curve is obtained by summing the quantities of the four kinds of TSNAs contained in each sample previously quantified by use of a high performance liquid chromatograph (HPLC-MS/MS).

Next, for the validation sample group, the total amount of the four kinds of TSNAs is inferred by use of the calibration curve, from the obtained fluorescence fingerprint information, to thereby verify the calibration curve.

Figure 7:
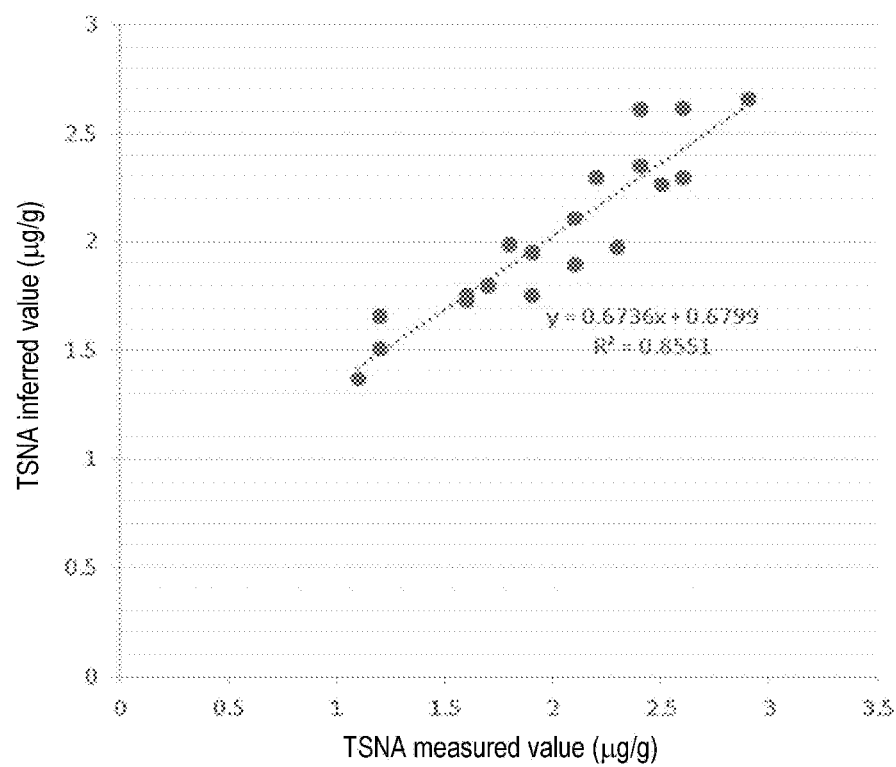
FIG. 7 is a graph in which points, that are defined by total amount of four kinds of TSNAs and inferred values based on fluorescence fingerprint information, for a plurality of samples, are plotted.

FIG. 7 is a graph, wherein the horizontal axis corresponds to measured values (chemical analysis values) obtained by use of a high performance liquid chromatograph (HPLC-MS/MS), the vertical axis corresponds to inferred values of total amount of the four kinds of TSNAs obtained by use of fluorescence fingerprint information; and points corresponding to respective samples belonging to the validation sample group are plotted in the graph.

Regarding the calibration sample group, the coefficient of determination $R^2=0.99$ (SEC=0.08 μg/g), and there is high correlation between chemical analysis values and inferred values according to the calibration curve, so that it is confirmed that accuracy of inference is satisfactory. Further, according to FIG. 7, regarding the accuracy of inference with respect to the validation sample group, the coefficient of determination $R^2=0.86$ (SEP=0.22 μg/g), so that effectiveness of the calibration curve has been confirmed.

[Inference of the Total Amount of the Four Kinds of TSNAs in a Sample (Tobacco Raw Material) That Contain Unknown Quantities of the Four Kinds of TSNAs]

By using a calibration curve, effectiveness of which has been confirmed, and based on fluorescence fingerprint information of a sample (tobacco raw material) that contains unknown quantities of the four kinds of TSNAs, the total amount of the four kinds of TSNAs contained in the sample is inferred.

It should be reminded that, regarding the sample that contains unknown with respect quantities of the four kinds of TSNAs, although it is possible to omit preprocessing applied to the obtained fluorescence fingerprint information, it is also possible to perform preprocessing having contents identical to those in the preprocessing performed when obtaining the calibration curve.

[Inference of Respective Quantities of the Four Kinds of TSNAs Contained in an Unknown Sample]

The contained quantities of the four kinds of TSNAs are inferred based on the inferred total amount of the four kinds of TSNAs and a known abundance ratio between respective TSNAs.

In this connection, as explained above, abundance ratios among respective TSNAs are approximately constant in the case that the same species of tobacco is used; so that, if it is supposed that the known abundance ratio among respective TSNAs is a:b:c:d, the contained quantities of the four kinds of TSNAs can be calculated by multiplying the total amount of the four kinds of TSNAs by $a/(a+b+c+d)$, $b/(a+b+c+d)$, $c/(a+b+c+d)$, and $d/(a+b+c+d)$, respectively.

[One Preferred Embodiment of the Present Invention]

The inventors of the present invention have further performed detailed analysis, and found that further improvement in accuracy of inference can be expected by measuring fluorescence via a filter for reducing intensity of light in a specific wavelength range, in a fluorescence fingerprint information obtaining process such as that in the embodiment explained above. In the following description, the above matter will be explained in detail.

Figure 9:
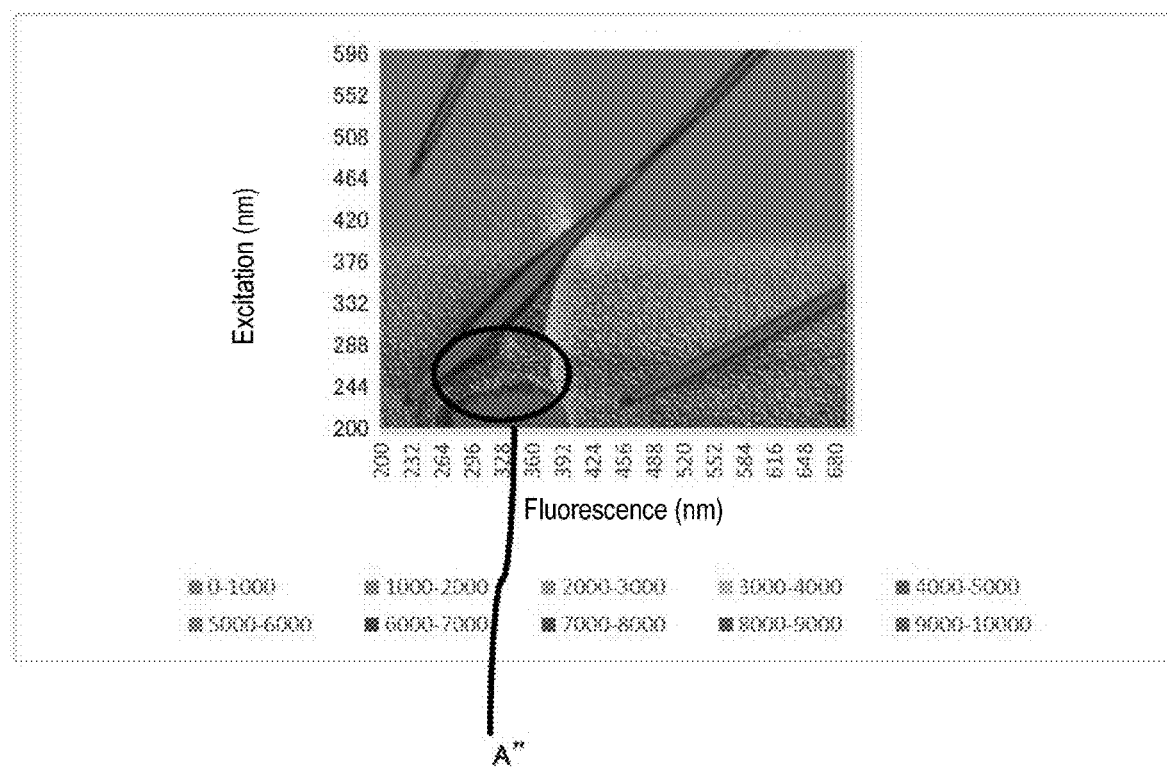
FIG. 9 is a figure representing an example of a fluorescence fingerprint of a sample, obtained by measuring fluorescence via a filter which reduces intensity of light having a wavelength range equal to or greater than 400 nm.

FIG. 9 is a figure representing an example of a fluorescence fingerprint of an authentic sample obtained by use of the present embodiment, wherein the authentic sample contains TSNAs reagents similar to that in FIG. 6. In this regard, the authentic sample was prepared by mixing reagents of the four kinds of TSNAs with an ethanol solution, wherein the ratio among the reagents was approximately the same as the ratio between those in Burley; and the total of the four kinds of TSNAs contained in the authentic sample was 1.28 n/g.

The region in the elliptical frame, to which symbol "A'''" is assigned, in FIG. 9 ("region A'''") is the region corresponding to the region "A'" in FIG. 6.

Further, the conditions of measurement of the fluorescence fingerprint are the same as those in FIG. 6 except for measurement of fluorescence via a filter, with excitation light of 200-600 nm, fluorescence of 200-700 nm, resolution of 2.5 nm, slit width of 2.5 nm, and photomultiplier-tube sensitivity of 950 V.

The filter used has a function for reducing the intensity of light in a wavelength range of 400 nm or more. In other words, the filter used is that having a function for reducing, according to a predetermined light reducing rate, light in a wavelength range approximately corresponding to visible light in the light (florescence) emitted from the sample.

Figure 10:
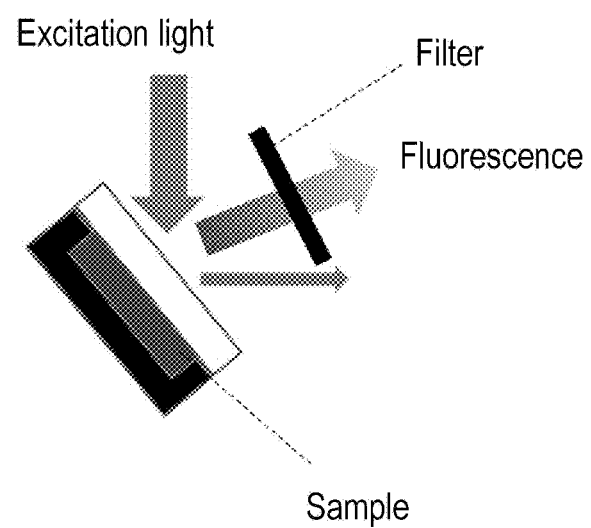
FIG. 10 is a schematic diagram for explaining an overview of arrangement of a filter which reduces intensity of light having a wavelength range equal to or greater than 400 nm.

FIG. 10 is a schematic diagram for explaining an overview of arrangement of a filter which has a function such as that explained above. It should be reminded that the filter is not necessarily one, and may be a combination of a band pass filter, which allows light in a predetermined wavelength range to pass through it, and a light reducing filter. Further, the wavelength range and the light reducing rate may be set appropriately according to the kind, the characteristics of a sample.

It should be reminded that, in the preprocessing performed when obtaining fluorescence fingerprint information, and in processes for creating and verifying the calibration curve using the obtained fluorescence fingerprint information, the techniques such as those explained above are used, so that details thereof will be omitted.

Figure 11:
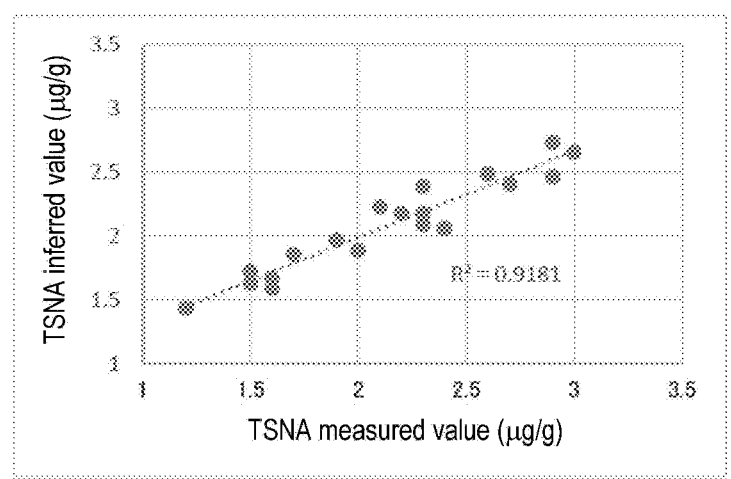
FIG. 11 is a graph in which points, that are defined by total amount of four kinds of TSNAs and inferred values based on fluorescence fingerprint information, for a plurality of samples, are plotted, the fluorescence fingerprint information being obtained by measuring fluorescence via a filter which reduces intensity of light having a wavelength range equal to or greater than 400 nm.

FIG. 11 is a graph wherein the horizontal axis corresponds to measured values (chemical analysis values) obtained by use of a high performance liquid chromatograph (HPLC-MS/MS), the vertical axis corresponds to inferred values of total amount of the four kinds of TSNAs according to fluorescence fingerprint information obtained by use of the present embodiment, and points corresponding to respective samples belonging to the validation sample group are plotted. Regarding the graph in FIG. 11, it should be reminded that the calibration sample group and the validation sample group, that are used, are the same as those used in the case in which the results relating to FIG. 7 were obtained, and that the calibration curve is also created by applying the PLS regression analysis (the number of latent factors is 3) in a manner similar to that relating to FIG. 7.

According to FIG. 11, regarding accuracy of inference in the validation sample group, has a coefficient of determination $R^2=0.92$ (SEP=0.19 μg/g), and there is high correlation between chemical analysis values and inferred values according to the calibration curve, so that satisfactory accuracy of inference has been achieved.

When FIG. 11 is compared with FIG. 7, it is considered that further improvement of accuracy of inference can be expected by using the present embodiment, and the present embodiment may be applied more preferably to inference of the total amount of the four kinds of TSNAs contained in a sample.

In this regard, a technique similar to the above-explained technique may be adopted for inference of the contained quantities of the four kinds of TSNAs, based on the inferred total amount of the four kinds of TSNAs and the known abundance ratio among respective TSNAs.

It should be reminded that the present invention may also be adopted in various embodiments, which are different from the above-explained embodiments, within the scope of the technical ideas recited in the claims.

REFERENCE SIGNS LIST

100: TSNAs quantification apparatus
110: Preprocessing means
120: Inference model creating means
130: Total amount inferring means
140: Contained quantity inferring means

The invention claimed is:

1. A method for quantifying tobacco raw materials using fluorescence fingerprint analysis, comprising:
a fluorescence fingerprint information obtaining process for obtaining fluorescence fingerprint information consisting excitation wavelength, fluorescent wavelength, and fluorescence intensity data of tobacco raw materials which contain four kinds of tobacco-specific nitrosamines (TSNAs) which are NNN, NNK, NAT, and NAB;
an inference model creating process for obtaining a calibration curve by setting the fluorescence fingerprint information as an explanatory variable and setting total amount of the contained four kinds of TSNAs, that are calculated from values of known quantities of the four kinds of TSNAs contained in the tobacco raw materials, as a response variable;

a total amount inferring process for inferring a total amount of the four kinds of TSNAs contained in the tobacco raw materials, based on the calibration curve and fluorescence fingerprint information of tobacco raw materials which contain unknown quantities of the four kinds of TSNAs; and a quantity inferring process for inferring the contained quantities of the four kinds of TSNAs, based on the inferred total amount of the four kinds of TSNAs and a known abundance ratio among the four kinds of TSNAs.

2. The method for quantifying tobacco raw materials using fluorescence fingerprint analysis as recited in claim 1, wherein, in the fluorescence fingerprint information obtaining process, the fluorescence fingerprint information is obtained by measuring fluorescence via a filter which reduces intensity of light in a specific wavelength range.

3. The method for quantifying tobacco raw materials using fluorescence fingerprint analysis as recited in claim 2, wherein, in the inference model constructing process, the calibration curve is created by performing multivariate analysis.

4. The method for quantifying tobacco raw materials using fluorescence fingerprint analysis as recited in claim 2, wherein the method further comprises a preprocessing process comprising a deletion process applied to the fluorescence fingerprint information.

5. The method for quantifying tobacco raw materials using fluorescence fingerprint analysis as recited in claim 2, wherein the specific wavelength range is equal to or greater than 400 nm.

6. The method for quantifying tobacco raw materials using fluorescence fingerprint analysis as recited in claim 5, wherein, in the inference model constructing process, the calibration curve is created by performing multivariate analysis.

7. The method for quantifying tobacco raw materials using fluorescence fingerprint analysis as recited in claim 5, wherein the method further comprises a preprocessing process comprising a deletion process applied to the fluorescence fingerprint information.

8. The method for quantifying tobacco raw materials using fluorescence fingerprint analysis as recited in claim 1, wherein, in the inference model constructing process, the calibration curve is created by performing multivariate analysis.

9. The method for quantifying tobacco raw materials using fluorescence fingerprint analysis as recited in claim 4, wherein the multivariate analysis is PLS regression analysis.

10. The method for quantifying tobacco raw materials using fluorescence fingerprint analysis as recited in claim 1, wherein the method further comprises a preprocessing process comprising a deletion process applied to the fluorescence fingerprint information.

11. The method for quantifying tobacco raw materials using fluorescence fingerprint analysis as recited in claim 1, wherein a test sample is pulverized and mixed to have a powder form, before irradiation of excitation light thereon.

12. The method for quantifying tobacco raw materials using fluorescence fingerprint analysis as recited in claim 11, wherein the test sample is pulverized to become particles in such a manner that each of the particles has a size equal to or less than 1 nm.

13. The method for quantifying tobacco raw materials using fluorescence fingerprint analysis as recited in claim 1, wherein the tobacco raw material is stored for a predetermined period of time under a predetermined harmony condition, in advance, for making the water content therein constant.

14. The method for quantifying tobacco raw materials using fluorescence fingerprint analysis as recited in claim 13, wherein the predetermined harmony condition is a condition specifying that the place is the inside of a room in which temperature is 22 degrees Celsius and humidity is 60 percent, and the predetermined period of time is equal to or longer than 24 hours.

15. A program embodied on an non-transitory computer readable medium for causing a computer to perform the method recited in claim 1.

16. An apparatus comprising:

an inference model creating means that inputs fluorescence fingerprint information consisting of excitation wavelength, fluorescent wavelength, and fluorescence intensity data of tobacco raw materials which contain four kinds of tobacco-specific nitrosamines (TSNAs) which are NNN, NNK, NAT, and NAB, and obtains a calibration curve by setting the fluorescence fingerprint information as an explanatory variable and setting total amount of the contained four kinds of TSNAs, that are calculated from values of known quantities of the four kinds of TSNAs contained in the tobacco raw materials, as a response variable;

a total amount inferring means for inferring a total amount of the four kinds of TSNAs contained in the tobacco raw materials, based on the calibration curve and fluorescence fingerprint information of tobacco raw materials which contain unknown quantities of the four kinds of TSNAs; and a contained quantity inferring means for inferring the contained quantities of the four kinds of TSNAs, based on the inferred total amount of the four kinds of TSNAs and a known abundance ratio among the four kinds of TSNAs.

17. The apparatus as recited in claim 16, wherein the fluorescence fingerprint information is obtained by measuring fluorescence via a filter which reduces intensity of light in a specific wavelength range.

18. The apparatus as recited in claim 17, wherein the specific wavelength range is equal to or greater than 400 nm.

19. The apparatus as recited in claim 16, wherein the apparatus further comprises a preprocessing means for performing a pre-process applied to the fluorescence fingerprint information.

20. The apparatus as recited in claim 19, wherein the pre-process comprises a deletion process applied to the fluorescence fingerprint information.

* * * * *